350-377 SR 10304 SEARCH ROOM

[redacted] XR 3,626,394

[11] 3,626,394

[72] Inventors Alfred M. Nelson
Redondo Beach;
Henry W. Griffiths, Torrance, both of Calif.

[21] Appl. No. 27,130
[22] Filed Apr. 9, 1970
[45] Patented Dec. 7, 1971
[73] Assignee The Magnavox Company
Continuation-in-part of application Ser. No. 582,721, Sept. 28, 1966, now abandoned. This application Apr. 9, 1970, Ser. No. 27,130

[54] MAGNETO-OPTICAL SYSTEM

22 Claims, 2 Drawing Figs.

Figure 1:
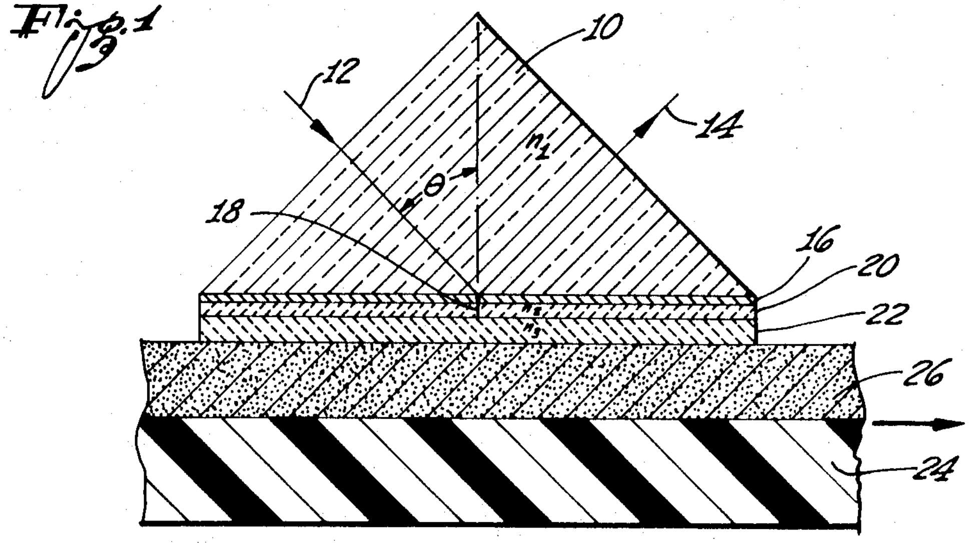

[52] U.S. Cl. 340/174.1MO, 350/151
[51] Int. Cl. G11b 7/02
[50] Field of Search 340/174.1 MO; 350/151

[56] References Cited

UNITED STATES PATENTS

| | | | |
|---|---|---|---|
| 3,174,140 | 3/1965 | Hagopian et al. | 340/174.1 MO |
| 3,229,273 | 1/1966 | Boaba et al. | 340/174.1 MO |

OTHER REFERENCES

" Thin-Film Magneto-Optic Read-Write Memory Element" by A. M. Stoffel IBM Tech. Disc. Bulletin, Vol. 12 No. 1 June 1969.

*Primary Examiner*—Terrell W. Fears
*Assistant Examiner*—Vincent P. Canney
*Attorney*—Smyth, Roston & Pavitt ABSTRACT: A magneto-optical transducer simultaneously utilizing both the Faraday and Kerr effects. The transducer includes a thin magnetic film having substantially a critical thickness and disposed relative to a magnetic medium to receive the magnetic states previously recorded on the magnetic medium. The film is disposed to receive light and to rotate the light in accordance with the magnetic states induced in the film and to reflect a first portion of the rotated light and pass a second portion of the rotated light. An optical prism is disposed adjacent the thin magnetic film and is provided with a particular index of refraction to direct the light to the thin film.

A first layer of dielectric material is disposed adjacent the thin film and is provided with dielectric characteristics to transmit the portion of the light passing through the thin film and to produce substantially an in-phase relationship between the reflected and transmitted portions of the light. A second layer of dielectric material is disposed adjacent the first layer of dielectric material and is provided with dielectric characteristics to produce substantially a total internal reflection of the transmitted light.

3626394
OR IN 360/114

INVENTORS:
Alfred M. Nelson
Henry W. Griffiths

By Smyth, Roston & Pavitt
ATTORNEYS

MAGNETO-OPTICAL SYSTEM

This is a continuation-in-part of application Ser. No. 582,721 filed Sept. 28, 1966, now abandoned, by Alfred M. Nelson and Henry W. Griffiths, entitled MAGNETO-OPTICAL SYSTEM EMPLOYING A THIN MAGNETIC FILM AND AT LEAST A PAIR OF LAYERS OF DIELECTRIC MATERIAL, and assigned to the same assignee as the instant application.

This invention relates to improvements in the magneto-optical of information recorded magnetically. Specifically, the present invention relates to the use of magneto-optical techniques for the reproduction of the information.

In recent years, the use of magnetic recording has become increasingly popular for the storage of information. One problem which is present with magnetic recording is the discrepancy which exists between the recording and reproduction of the information on a magnetic medium. Heretofore it has been possible to record much higher densities of the information on the magnetic medium or much higher frequency information on the magnetic medium than was possible to reproduce from the magnetic medium. One solution to the discrepancy between the recording and reproducing as explained above has been the use of a reproduction technique called magneto-optical reproducing.

Magneto-optical reproducing provides for reproduction of the information recorded on a magnetic medium using a change in an optical property in accordance with the magnetic states of the information recorded on the magnetic medium. In particular, the Kerr and Faraday magneto-optical effects have been used to provide for an optical readout of information which has been recorded as a plurality of magnetic states on a magnetic medium.

The Kerr magneto-optical effect may generally be defined as a rotation of light energy in the major plane of polarization of the light energy upon the reflection of the light energy from the surface of a magnetic medium. The direction of rotation and amount of rotation of the light energy is in accordance with the magnetization of the magnetic medium. It is to be appreciated that the actual rotation of the light energy is very small, usually less than 1°.

The Faraday magneto-optical effect may be defined as a rotation of light energy in the major plane of polarization of the light energy upon the passage of the light energy through the magnetic medium. The rotation and direction of rotation of the light energy again is in accordance with the magnetization of the magnetic medium.

In using both the Kerr and Faraday magneto-optical effects, an output signal is developed which has an amplitude in accordance with the magnitude of the angle or rotation of the light energy. Therefore, the amplitude of the output signal is dependent upon the magnitude of the angle or rotation of the light energy and the higher the angle of rotation the larger the output signal. In addition, the larger the output signal the higher the signal-to-noise ratio. It is, therefore, desirable to have the largest possible output signal. It is also desirable to recapture as much of the light energy directed to the magnetic medium as possible. The recapturing of the light energy is desirable since it improves the signal-to-noise ratio and prevents the need for sources of light energy having high outputs so as to achieve meaningful light output values.

Copending applications Ser. No. 429,084 (now U.S. Pat. No. 3,474,428magneto-optical filed Jan. 29, 1965, in the names of Alfred M. Nelson and Henry W. Griffiths, and Ser. No. 539,386 filed Apr. 1, 1966, in the names of Stanton H. Cushner, Patrick E. Ferguson, Henry W. Griffiths and Alfred M. Nelson, both copending applications assigned to the assignee of the instant case, are directed to magneto-optical transducers which are used in a magneto-optical reproducing system and which provide for a reproduction of information recorded on a magnetic medium through the use of an indirect magneto-optical technique.

The indirect magneto-optical reproduction of information is accomplished through the use of a thin film of magnetic material which is disposed adjacent to a magnetic medium containing magnetic states representing magnetic information, so that the magnetic states of the magnetic medium induce corresponding magnetic states in the thin film. The magneto-optical effect or the rotation of the light energy in accordance with the magnetization is produced from the thin film rather than from the magnetic medium. As indicated above, this technique is referred to as indirect magneto-optical reproduction.

The indirect magneto-optical reproducing technique described above is advantageous over a direct magneto-optical reproducing technique because it is simpler and therefore less expensive to provide for the desired optical qualities in the thin magnetic film than it is to provide for the same optical qualities in the magnetic medium. Also, the oxides generally used for the typical magnetic mediums of the prior art provide for undesired dispersive quantities to light energy directed to the magnetic medium. It would be very difficult and expensive to produce a magnetic medium which would have the proper optical surface and even when a proper optical surface is produced the magnetic medium produces a poor reflection of the light energy.

The use of the indirect magneto-optical technique is also preferable to a direct magneto-optical reproduction technique since the indirect technique allows for improvements in the amplitude of the angle of rotation of the light energy and, in addition, allows for improvements in the quantity of rotated light energy which is recovered.

For example, one proposed form of magneto-optical reproducer uses a magneto-optical transducer which includes a prism substrate. The prism substrate includes a thin magnetic film of a critical thickness so as to produce a maximum rotation of the light energy. The prism substrate is also designed to produce a total internal reflection of the light energy directed to the thin magnetic film through the prism. One problem is that the thin magnetic film partially destroys the total internal reflection effect thereby losing a great deal of the light energy which is directed to the thin magnetic film through the prism substrate.

As a partial solution to this above-described problem, it has also been proposed to use a layer of dielectric material over the thin film and wherein the dielectric material has a particular thickness or a particular index of refraction to increase the reflectivity from the magneto-optical transducer so as to increase the quantity of rotated light energy which is recovered. Although the various above-mentioned proposals have resulted in improved magneto-optical reproducing techniques for the reproduction of magnetic information from magnetic mediums, it would be desirable to further improve the magneto-optical techniques so as to broaden the utility of magneto-optical reproduction of information recorded on magnetic mediums.

The present invention is directed to indirect magneto-optical reproduction and incorporates a three-layer structure to optimize the rotation and reflectivity of the light energy directed toward the thin magnetic film and to minimize the loss of the light energy. The three-layered structure of the present invention includes a thin magnetic film having a critical thickness to maximize the rotation of the light energy directed to the thin film through a prism. The critical thickness of the thin magnetic film is generally very thin and would usually transmit a significant component of light energy which would normally be lost in addition to the reflected component of the light energy.

The present invention includes a first layer of dielectric material which has a critical thickness so as to delay the transmitted light energy and thereby provide transmitted components of light energy which are in an in-phase relationship with the reflected components of the light energy. The total of the transmitted and reflected components would therefore provide for a large total quantity of light energy if the transmitted component of light energy could be recovered. The first dielectric layer has an index of refraction relative to the index of refraction of the prism so that the light energy directed to the thin film through the prism and which is transmitted through the thin film also is transmitted through the first dielectric layer.

The present invention also includes a second layer of dielectric material which has an index of refraction relative to the index of refraction of the prism so that the light energy which is transmitted through the prism, the thin magnetic film and first dielectric layer undergoes total internal reflection at the interface between the first and second dielectric layers. Actually, the light energy does not undergo the total internal reflection exactly at the interface of the first and second dielectric layers but enters slightly into the second dielectric layer before passing back into the first dielectric layer, the thin magnetic film and the prism. Since the light energy is passing through both the first and second dielectric layers, it is important that both the first and second dielectric layers are constructed of low-loss dielectric material.

The above-described structure of the present invention allows for a high rotation of the light energy and also allows for the recovery of a high percentage of the rotated light energy. In addition, the above-described structure provides for other improvement in the reproduction of information using the magneto-optical technique. For example, the prism may be constructed of material having a relatively high index of refraction which improves the rotation of the light since the rotation of the light is proportional to the square of the index of refraction of the prism. When the prism is constructed of material having a high index of refraction, the three-layered structure of the present invention may be easily designed in accordance with the index of refraction of the prism so that the high rotation of the light is obtained and also so that there is a minimal loss of light energy.

The three-layered structure of the present invention described above may be disposed on the prism so that the prism may be considered to be a substrate, or the three-layered structure may be disposed on the magnetic medium. When the three-layered structure is disposed on the magnetic medium, a layer of liquid material is disposed between the prism and the three-layered structure during reproduction so that the layer of liquid material provides for an optical coupling of the light energy from the prism to the three-layered structure.

Figure 2:
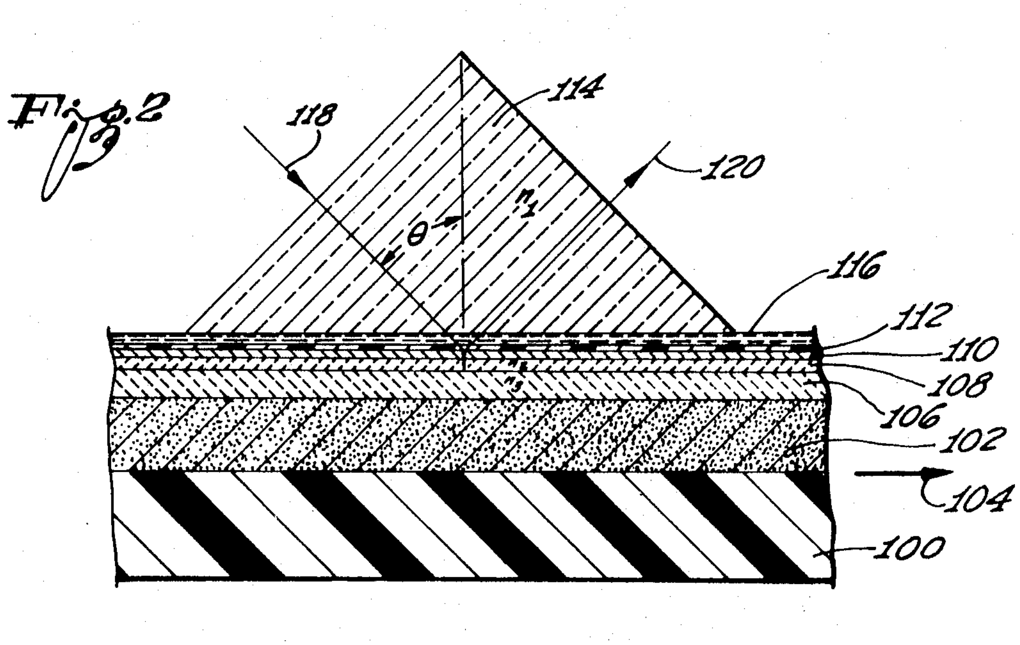

A clearer understanding of the invention will be had with reference to the following description and illustrations wherein:

FIG. 1 illustrates a magneto-optical transducer including a prism substrate having a three-layered structure disposed on the prism substrate, and FIG. 2 illustrates a magnetic medium including a three-layered transducing structure and a prism coupled to the three-layered transducer through a liquid coupling medium.

In FIG. 1, a magneto-optical transducer constructed in accordance with the present invention is shown. The magneto-optical transducer of FIG. 1 includes an optical prism 10 which is used as a substrate for the layers of various materials which constitute the invention. The optical prism 10 has an index of refraction of $n_1$ and it is desirable to have the index of refraction of the optical prism to be as high as possible. For example, the index of refraction for the optical prism 10 may have an index of refraction of 1.9 or higher.

Light energy 12 is directed to the optical prism 10 and passes into the optical prism 10 and makes an angle $\theta$ with a line drawn normal to one face of the optical prism 10. The light energy 12 is the input light energy and light energy 14 is the output light energy. This output light energy 14 has a rotational component in accordance with the Kerr and Farraday magneto-optical effects and the particular rotation and other characteristics of the rotated light energy 14 may be better understood with reference to copending application Ser. No. 539,386 filed Apr. 1, 1966, and having Stanton H. Cushner, Patrick E. Ferguson, Henry W. Griffiths and Alfred M. Nelson as the inventors.

Disposed on one surface of the optical prism 10 is a thin film of magnetic material 16. The light energy 12 directed to the thin film 16 is rotated in accordance with the magnetic states in the thin film 16 so as to produce light energy 14 which contains the rotated components. As indicated above, a greater understanding of the magneto-optical effect will be had with reference to copending application Ser. No. 539,386.

The thin film 16 is of a critical thickness so as to provide for the maximum rotational component in the light energy 14. For example, when a material compound of 50 percent cobalt and 50 percent iron is used as the thin film 16, the thickness of the thin film may be approximately 175 angstroms. Similarly, when the material used as the thin film 16 is iron, the critical thickness may be approximately 215 angstroms. When the thin film is of a critical thickness, the thin film is significantly thin so that it exhibits a substantial transmissivity. Although the optical prism 10 is designed to provide for total internal reflection, the layer of thin magnetic film 16 partially destroys the total internal reflection effect so that a significant portion of the light energy enters into the thin film 16 and is transmitted through the thin film 16.

The light energy transmitted through the thin film 16 is shown by line 18. The line 18 is substantially vertical since the thin film 16 has a refractive index significantly higher than the refractive index of the optical prism 10 and the refraction of light energy, therefore, would be significant.

In order to insure the recapture of this light energy 18 which is transmitted through the thin film 16, it is desirable to provide for the total internal reflection of the transmitted light energy at some point after the transmitted light energy passes through the magnetic layer 16. It is also desirable, however, that the transmitted light energy 18 is subjected to a total internal reflection so as to rejoin and become part of the output light energy 14, be in phase with the normal reflected component of the light energy. The normal reflected component of light energy which is part of the output light energy 14 is due to the reflection at the interface between the optical prism 10 and the magnetic thin film 16.

A dielectric layer 20, such as cerium oxide or calcium silicate, is provided adjacent to the thin film 16 so as to delay the transmitted light energy 18 so that when the transmitted light energy 18 rejoins the normal reflected component of the light energy, the transmitted component is in phase with the reflected component. The dielectric layer 20, therefore, also has a critical thickness so as to provide for the particular delay, and for the dielectric material of cerium oxide the critical thickness is approximately 2,000 Angstroms and for the dielectric material of calcium silicate the critical thickness is approximately 3,500 Angstroms. In addition, it is desired that the transmitted light energy 18 pass through the layer of dielectric material 20 so that the particular delay has its full effect so as to provide for the maximum recovery of light energy from the prism. The layer of dielectric material 20, therefore, has an index of refraction $n_2$ and the relationship between the index of refraction of the optical prism 10 and the dielectric layer 20 is such that the transmitted light energy 18 passes through the dielectric layer 20. In particular, the relationship for passage of the transmitted light energy through the dielectric layer 20 is:

$$\sin \theta < n_2/n_1.$$

It is also desired that the transmitted light energy passing through the dielectric layer 20 be recovered as indicated above so as to maximize the output from the magneto-optical transducer of FIG. 1. A second layer of dielectric material 22 such as magnesium floride having a thickness of approximately 4,000 Angstroms is, therefore, provided so as to enhance the recovery of the light energy. The second layer of dielectric material 22 also serves as a protective layer for the magneto-optical transducer, as will be explained later. The second layer of dielectric material 22 has an index of refraction of $n_3$ and the index of refraction of the second layer of dielectric material 22 has a relationship to the index of refraction of the optical prism 10 so that the light energy experiences a total internal reflection at the interface between the dielectric layers 20 and 22. The proper relationship for the total internal reflection is when:

$$\sin \theta \geqq n_3/n_1.$$

Actually, the total internal reflection does not take place exactly at the interface between dielectric layers 20 and 22 but at some finite distance into the dielectric layer 22. This has been experimentally demonstrated and since the light energy does enter into the dielectric layer 22, it is important that the dielectric layer 22, as well as the dielectric layer 20, be of low-loss material.

As a particular example, using a 90° optical prism wherein $\theta$ is 45°, the optical prism 10 does have an index of refraction of 1.9, the dielectric layer 20 may also have an index of refraction of 1.9 and the dielectric layer 22 may have an index of 1.3. It is to be appreciated that the above values are illustrative only, and that other appropriate values for the various materials may be used.

The magneto-optical transducer of FIG. 1 may be used to provide a readout from a magnetic medium such as the magnetic tape shown in FIG. 1. For example, the magnetic tape shown in FIG. 1 includes a substrate 24 which supports an iron oxide layer 26. Magnetic information may be recorded as changes in the magnetic states of the magnetic layer 26 in accordance with known recording techniques. The tape may be moved in the direction shown by the arrow 28 so that successive magnetic states in the magnetic layer 26 are disposed adjacent to the magneto-optical transducer. The particular magnetic states of the magnetic layer 26 induce corresponding magnetic states into the thin magnetic film 16.

Light energy 12 is directed toward the optical prism 10 and passes through one face of the optical prism to the thin magnetic film 16. Some of the light energy 12 is reflected directly from the surface of the thin film 16 to become a part of the output light energy 14, and the reflected light energy includes a rotational component in accordance with the magnetic states induced in the thin film 16 by the magnetic layer 16. In addition, some of the light energy 18 is transmitted through the thin film 16 and is additionally delayed in accordance with the delay provided by the dielectric layer 20.

The light energy 18 which is transmitted through the thin film 16 and the dielectric layer 29 experiences total internal reflection due to the dielectric layer 22. The light energy 18 is then transmitted back through the dielectric layer 20 and the thin film 16 and the transmitted light energy 18 includes a rotational component in accordance with the magnetic states in the thin film 16. The transmitted component 18 of the original light energy 12 adds up in phase with the reflected component of the light energy 12 because of the critical thickness of the dielectric layer 20 which provides for a desired delay by the dielectric layer 20. The output light energy 14 is therefore a summation of the reflected and transmitted components of the original light energy 12.

It is to be appreciated that the above description of the operation of the magneto-optical transducer of FIG. 1 has been greatly simplified. For example, the original light energy 12 not only experiences an initial reflection from the thin film 16 at the interface between the optical prism 10 and the thin film 16, but multiple reflections are experienced at progressive depths into the thin film 16. In addition, not all of the light energy experiences a total internal reflection and is retransmitted back to become a part of the output light energy 14. Also, some of the light energy is in turn reflected within the dielectric layers 20 and 22 and also at the interface between the dielectric layers 20 and the thin film 16 and some of this reflected light energy is lost. Essentially, the operation of the magneto-optical transducer of FIG. 1 has been explained using the extreme boundaries, which produce the first reflected component from the thin film 16 and total internal reflection component from the interface between the dielectric layers 20 and 22.

The magneto-optical transducer of FIG. 1 provides for optimal rotation to the incoming light energy 12 so as to produce an output light energy signal 14 having a higher angle of rotation than prior art transducers. In addition, the three-layer transducer structure of the present invention described in FIG. 1 provides for the return of a maximum amount of light energy with a small loss of the light energy in the transducer.

FIG. 2 illustrates a magneto-optical transducer structure which is used in combination with a magnetic medium such as a magnetic tape. The magnetic tape may include a substrate 100 and a magnetic layer 102 and the magnetic tape may be moved in a direction shown by the arrow 104. Magnetic information may be recorded in the magnetic layer 102 of the magnetic tape in the same manner as the magnetic recording of information in the layer 26 of FIG. 1 and such recording techniques are conventional in the art.

Disposed on top of the magnetic layer 102 is a dielectric layer 106 which is equivalent to the dielectric layer 22 of FIG. 1. Also included in the embodiment of FIG. 2 is a dielectric layer 108 which is equivalent to the dielectric layer 20 of FIG. 1. A thin magnetic film 110 shown in FIG. 2 is equivalent to the thin magnetic film 16 of FIG. 1. The embodiment of FIG. 2 also includes an additional dielectric layer 112 which serves as a protective coating for the thin film 110.

When information is recorded in the magnetic layer 102 it induces corresponding magnetic states in the thin film 110. The information is read from the tape structure shown in FIG. 2 through the use of an optical prism 114 and a liquid coupling medium 116. The liquid coupling medium may be, for example, a liquid such as xylene, glycerine or one of the silicons. Xylene is a preferred liquid coupling medium since it evaporates rapidly. The xylene may be applied to the surface of the tape as shown in FIG. 2, specifically to the surface of the dielectric layer 112, so as to provide for the optical coupling between the prism 14 and the magnetic-optical transducer at a particular position. After the magnetic optional readout is accomplished of the particular position along the length of the magnetic tape the xylene evaporates at some later position in the tape loop.

The liquid coupling medium 116 and the protective dielectric layer 112 both have an index of refraction relative to the index of refraction of the optical prism 114 so that light energy is transmitted through the liquid coupling medium 116 and the protective layer 112. For example, if the index of refraction $n_1$ of the optical prism 114 is 1.9, such as described with reference to FIG. 1, the index of refraction of the liquid coupling medium 116 and the protective layer 112 may both be approximately 1.9.

The dielectric layers 108 and 106 have indexes of refraction of $n_2$ and $n_3$ which are similar to the indexes of refraction of the dielectric layers 20 and 22. In particular, $\sin \theta < n_2/n_1$ so that the light passes through the dielectric layer 108 and $\sin \theta \geqq n_3/n_1$ so that total internal reflection takes place theoretically at the interface between the dielectric layers 108 and 106. As explained above with reference to FIG. 1, the actual total internal reflection takes place at some finite distance within the dielectric layer 106.

In the operation of the embodiment of FIG. 2, light energy 118 is directed through the prism 114, the dielectric layer 116 and a protective coating 112 to impinge on the thin film 110. Some of the light energy is reflected from the thin film 110 and experiences rotations in accordance with the magnetic states in the thin film 110. A portion of the light energy is transmitted through the film 110 and the dielectric layer 108 and this transmitted portion of light energy experiences total internal reflection. The transmitted light energy in then sent back through all the various layers of material and becomes a part of an output light energy 120.

As indicated above with reference to FIG. 1, the thin film 110 has a critical thickness to maximize rotation, the dielectric layer 108 has a critical thickness to provide an in-phase relationship between the reflected and transmitted components of light energy and the dielectric layer 106 has an index of refraction to provide for total internal reflection. The composite structure provides for an output signal having a high angle of rotation and a large reflectivity so as to maximize rotation and minimize the loss of light energy.

It is to be appreciated that other adaptations and modifications of the invention may be made and the invention has been described with reference to particular embodiments only. For example, the invention has been described with reference to the use of an optical prism, but it is to be appreciated that other structures may be used to provide the same functions of the optical prism such as the total internal reflection. The invention, therefore, is only to be limited by the appended claims.

What is claimed is:

1. In combination for reproducing information recorded as particular magnetic states in a magnetic medium, a transducer structure for producing rotations in light energy directed toward the transducer in accordance with the recorded information, including:

a thin magnetic film disposed relative to the magnetic medium to provide for an induction of the magnetic states in the thin magnetic film in accordance with the magnetic states in the magnetic medium and to produce a reflected component of the light energy directed to the thin magnetic film and a transmitted component of such light energy with the reflected and transmitted components of such light energy having rotations in accordance with the magnetic states in the magnetic medium, a first dielectric layer of material disposed adjacent to the thin magnetic film to receive the transmitted component of light energy and having particular dielectric characteristics to provide a delay to the transmitted component of light energy to produce an in-phase relationship between the reflected light energy and the transmitted light energy, and a second dielectric layer of material disposed adjacent to the first dielectric layer of material and having particular dielectric characteristics to provide for a reflection of the transmitted component of the light energy.

2. The transducer structure of claim 1 wherein the thin magnetic film has a critical thickness to provide for an optimum rotation of the light energy.

3. The transducer structure of claim 1 wherein the thin magnetic film has a critical thickness to provide for an optimum rotation of the light energy and the first dielectric layer of material has a critical thickness to provide a maximum portion of the transmitted component of light energy in phase with the reflected component of light energy.

4. The transducer structure of claim 1 wherein the structure additionally includes an optical prism to direct the light energy to the thin magnetic film and wherein the optical prism has a high index of refraction to increase the rotation of the light energy.

5. The transducer structure of claim 1 additionally including an optical prism supporting the composite structure of the thin magnetic film, the first dielectric layer of material and the second dielectric layer of material and the optical prism having a high index of refraction.

6. The transducer structure of claim 1 wherein the composite structure of the thin magnetic film, the first dielectric layer of material and the second dielectric layer of material are supported by the magnetic medium and wherein the second dielectric layer is disposed adjacent the magnetic medium.

7. The transducer structure of claim 6 additionally including an optical prism having a high index of refraction for directing the light energy to the thin magnetic film and a liquid medium disposed between the optical prism and the thin magnetic film and having dielectric characteristics for providing an optical coupling of the light energy between the optical prism and the thin magnetic film.

8. In combination for reproducing information recorded as particular magnetic states in a magnetic medium, a transducer structure for producing rotations in light energy directed toward the transducer in accordance with the recorded information, including:

an optical prism constituting a support member and having a particular index of refraction, a thin magnetic film disposed relative to the magnetic medium and supported on the optical prism to obtain an induction of the magnetic states in the thin magnetic film in accordance with the magnetic states in the magnetic medium and to produce a reflected component of the light energy directed toward the thin magnetic film and a transmitted component of such light energy with the reflected and transmitted components of light energy having rotations in accordance with the magnetic states in the magnetic medium, a first dielectric layer of material supported on the thin magnetic film to receive the transmitted component of light energy and having an index of refraction relative to the particular index of refraction to pass the transmitted component of light energy through the first dielectric layer of material and to provide a delay to the transmitted component of light energy for producing an in-phase relationship between the reflected light energy and the transmitted light energy, and a second dielectric layer of material supported on the first dielectric layer of material and having an index of of refraction relative to the particular index of refraction to provide for a reflection of the transmitted component of the light energy.

9 The transducer structure of claim 8 wherein the thin magnetic film has a critical thickness to provide for an optimum rotation of the light energy and wherein the first dielectric layer of material has a critical thickness to provide a maximum portion of the transmitted component of light energy in phase with the reflected component of the light energy.

10. In combination for reproducing information recorded as particular magnetic states, a transducer structure for producing rotations in light energy directed toward the transducer in accordance with the recorded information, including:

a thin magnetic film having particular magnetic characteristics to receive the particular magnetic states and to produce a reflected component of the light energy directed to the thin magnetic film and a transmitted component of such light energy with the reflected and transmitted components of light energy having rotations in accordance with the magnetic states in the thin magnetic film, a first dielectric layer of material supporting the thin magnetic film to receive the transmitted component of light energy and having first particular dielectric characteristics to provide a delay to the transmitted component of light energy to produce an in-phase relationship between the reflected light energy and the transmitted light energy, a second dielectric layer of material supporting the first dielectric layer of material and having second particular dielectric characteristics to provide for a reflection of the transmitted component of the light energy passing through the first dielectric layer, and a magnetic medium supporting the second dielectric layer of material and having the particular magnetic states and disposed relative to the thin magnetic film to induce the particular magnetic states in the thin magnetic film.

11. The transducer structure of claim 10 wherein an optical prism is included for directing the light energy to the thin magnetic film and a liquid medium is disposed between the optical prism and the thin magnetic film and is provided with an index of refraction for producing an optical coupling of the light energy between the optical prism and the thin magnetic film and wherein the optical prism has a particular index of refraction and wherein the liquid and the first dielectric layer have indices of refraction relative to the index of refraction of the optical prism to transmit the light energy respectively directed to the liquid and the first dielectric layer and the second dielectric layer has an index of refraction relative to the index of refraction of the optical prism to provide for a total internal reflection of the transmitted component of the light energy.

12. A magneto-optical transducer for reproducing information recorded on a magnetic medium by producing rotations in light energy in accordance with the information, including:

a thin magnetic film disposed relative to the magnetic medium to obtain the induction of magnetic information on the thin magnetic film corresponding to the information recorded on the magnetic medium and having characteristics to reflect a first portion of the light energy directed to the thin magnetic film and to transmit a second portion of such light energy transmitted through the thin magnetic film and to produce rotations of such directed light in accordance with the information in the thin magnetic film, a first dielectric layer disposed adjacent to the thin magnetic film and having dielectric characteristics for operating upon the transmitted portion of the light energy to produce an in-phase relationship between the transmitted light energy and the reflected light energy, and a second dielectric layer disposed adjacent to the first dielectric layer and having dielectric characteristics to provide for a total internal reflection of the transmitted light energy to produce an output light signal composed of the reflected and transmitted portions of the light energy.

13. The transducer structure of claim 12 wherein the thin magnetic film has a critical thickness to provide for an optimum rotation of the light energy.

14. The transducer structure of claim 12 wherein the thin magnetic film has a critical thickness to provide for an optimum rotation of the light energy and the first dielectric layer of material has a critical thickness to provide a maximum portion of the transmitted light energy in phase with the reflected light energy.

15. The transducer structure of claim 12 wherein an optical prism is disposed adjacent the thin magnetic film to direct the light energy to the thin magnetic film and wherein the optical prism has a high index of refraction to increase the rotation of such light energy.

16. The transducer structure of claim 12 additionally including an optical prism having a particular index of refraction and supporting the composite structure of the thin magnetic film, the first dielectric layer and the second dielectric layer.

17. The transducer structure of claim 12 wherein the composite structure of the thin magnetic film, the first dielectric layer and the second dielectric layer are supported by the magnetic medium.

18. The transducer structure of claim 17 wherein an optical prism is disposed adjacent to the thin magnetic film for directing the light energy to the thin magnetic film and a liquid medium is disposed between the optical prism and the thin magnetic film and is provided with an index of refraction for producing an optical coupling of the light energy between the optical prism and the thin magnetic film.

19. A magneto-optical transducer for reproducing information recorded on a magnetic medium by producing rotations in light energy in accordance with the information, including:

an optical prism having a particular index of refraction, a thin magnetic film supported by the optical prism and disposed relative to the magnetic medium to obtain the induction of information on the thin magnetic film corresponding to the information recorded on the magnetic medium and to obtain a reflection of a first portion of the light energy directed to the thin magnetic film and a transmission of a second portion of such light energy through the thin magnetic film and to obtain rotations of the reflected and transmitted portions of such light energy in accordance with the information in the thin magnetic film, a first dielectric layer supported on the thin magnetic film and having an index of refraction relative to the particular index of refraction to pass the transmitted light energy and to produce an in-phase relationship between the transmitted light energy and the reflected light energy, and a second dielectric layer supported on the first dielectric layer and having an index of refraction relative to the particular index of refraction to provide a total internal reflection of the transmitted light energy for obtaining the production of an output light signal from the reflected and transmitted portions of the light energy.

20. The transducer of claim 19 wherein the thin magnetic film has a critical thickness to provide for an optimum rotation of the light energy and wherein the first dielectric layer has a critical thickness to provide a maximum in-phase relationship between the transmitted and reflected light energy.

21. A magneto-optical transducer for reproducing information recorded on a magnetic medium by producing rotations in light energy in accordance with the information, including:

a thin magnetic film having characteristics to reflect a first portion of the light energy directed to the thin magnetic film and to transmit a second portion of such light energy through the thin magnetic film and to produce rotations of the reflected and transmitted light in accordance with the information in the thin magnetic film, a first dielectric layer supporting the thin magnetic film and having dielectric characteristics to operate upon the transmitted light for producing an in-phase relationship between the transmitted light energy and the reflected light energy, a second dielectric layer supporting the first dielectric layer and having dielectric characteristics to provide for a reflection of the transmitted light energy to produce an output signal from the reflected and transmitted portions of the light energy, and a magnetic medium supporting the second dielectric layer and having particular magnetic states to induce the particular magnetic states in the thin magnetic film.

22. The transducer structure of claim 21 wherein an optical prism is included for directing the light energy to the thin magnetic film and a liquid is disposed between the optical prism and the thin magnetic film and is provided with dielectric characteristics for providing an optical coupling of the light energy between the optical prism and the thin magnetic film and wherein the optical prism has a particular index of refraction and wherein the liquid and the first dielectric layer have indices of refraction relative to the index of refraction of the optical prism respectively to transmit the light energy directed to the liquid and the first dielectric layer and the second dielectric layer has an index of refraction relative to the index of refraction of the optical prism to provide for a total internal reflection of the transmitted component of light energy.

* * * * *